United States Patent [19]

Rump et al.

[11] 4,012,248

[45] Mar. 15, 1977

[54] METHOD AND MEANS FOR PROVIDING A FOAMED PLASTIC SURFACE WITH A RELIEF STRUCTURE

[75] Inventors: Björn S. Rump, Genf, Switzerland; Bengt Johnard, Mondal, Sweden; Walter Schlegel, Oberrieden, Switzerland

[73] Assignee: Societe d'Etudes du Procede Noridem, Glarus, Switzerland

[22] Filed: May 24, 1973

[21] Appl. No.: 363,609

[30] Foreign Application Priority Data

May 24, 1972 Switzerland .................... 7640/72

[52] U.S. Cl. .................... 156/79; 156/247; 156/240; 156/277; 264/45.6; 264/54; 264/52; 264/DIG. 82; 427/146; 427/271; 428/158; 428/315; 428/195; 428/172; 428/914

[51] Int. Cl.² .................... B32B 3/00; B32B 5/20; B32B 31/00

[58] Field of Search ............... 264/47, 52, 54, 213, 264/45.6, 45.8, DIG. 82; 156/78, 237, 79, 239, 90, 240, 209, 289, 230, 238, 233, 247, 277; 161/413, DIG. 3, 406, 116; 117/3.1, 10, 8, 12, 38, 62.1, 72; 101/32, 34; 427/270, 147, 271, 146; 428/158, 914, 315, 172, 195, 200

[56] References Cited

UNITED STATES PATENTS

| | | | |
|---|---|---|---|
| 2,696,452 | 12/1954 | Trepp ...................... | 156/240 |
| 3,293,094 | 12/1966 | Nairn et al. ............... | 264/52 |
| 3,293,108 | 12/1966 | Nairn et al. ............... | 264/47 |
| 3,399,106 | 8/1968 | Palmer et al. ............. | 264/47 |
| 3,428,471 | 2/1969 | Tuthill et al. .............. | 264/52 |
| 3,519,527 | 7/1970 | Crowley .................... | 264/47 |
| 3,574,659 | 4/1971 | Kwart et al. ............... | 264/47 |
| 3,660,187 | 5/1972 | Shortway et al. .......... | 264/54 |
| 3,772,138 | 11/1973 | Witman ..................... | 264/52 |
| 3,804,700 | 4/1974 | Hoey ........................ | 156/78 |

*Primary Examiner*—Charles E. Van Horn
*Assistant Examiner*—J. J. Gallagher
*Attorney, Agent, or Firm*—Werner W. Kleeman

[57] ABSTRACT

A method of providing foam plastic surfaces with a relief structure comprising the steps of: producing printed films which contain at predetermined locations, substantially corresponding to the printing pattern, either (a) means which inhibit and/or accelerate foaming, or (b) a barrier layer material which prevents the throughpassage of the means which inhibits or accelerates foaming, applying the film, prior to foaming, to the base layer to be foamed, and this combined or composite material is heated to the foaming temperature, whereby by means of the migration of the means inhibiting and/or accelerating foaming in accordance with the printing pattern of the film into the base layer during foaming there is obtained the relief formation of the surface and the anchoring of the printed film at the surface.

There is also provided means for providing foam plastic surfaces with a relief structural design, which is characterized by the features that said means comprises an imprinted non-foamable self-supporting film or an imprinted film located at a carrier material, and wherein predetermined locations of the film corresponding to the printing design contain either, (a) means which inhibit and/or accelerate foaming, or (b) a barrier layer material which prevents the passage of the means inhibiting and/or accelerating foaming.

24 Claims, No Drawings

METHOD AND MEANS FOR PROVIDING A FOAMED PLASTIC SURFACE WITH A RELIEF STRUCTURE

BACKGROUND OF THE INVENTION

The present invention relates to a new and improved method of providing aerated or foamed plastic surfaces with a relief structure in which a pattern is applied, prior to foaming, to the surface of a base layer which is to be foamed, and during the course of foaming the foaming action is retarded and/or accelerated at certain locations corresponding to the applied pattern, in order to obtain a foamed plastic surface which possesses a relief structure coinciding with the applied pattern. The invention further relates to means for the performance of the aforesaid method.

Attempts have already been made for quite some time to provide aerated or foamed plastic surfaces, possessing a colored pattern or design, for instance materials suitable as floor or wall coverings, with a relief structure corresponding to the pattern. A technique in which initially a pattern is imprinted upon the foam plastic surface and then following the foaming operation there is obtained a permanent compression of the foamed plastic at certain locations of the impressed pattern by the application of external pressure and heat, is associated with the drawback that it is not readily possible to attain an exact correlation of the printing design with the relief or embossed pattern, and further, that for the purpose of carrying out this technique it is necessary to use precision operating and expensive equipment.

Hence, efforts have been expended for a considerable period of time to dispense with such type pattern-true embossment carried out after the foaming operation.

In U.S. Pat. No. 2,964,799, there is disclosed a method which, among other things, also can be employed to provide an aerated or foamed plastic with a relief-like surface in that during foaming a foamable layer is permitted to travel over a specially constructed heatable roller. This heatable roller possesses raised portions so that only at the locations of the raised portions of the heatable roller is the foamable layer heated to the requisite foaming temperature. Consequently, only at certain locations of the throughpassing web is the foamable layer foamed, and thus there is obtained a relief-like structure for the final product. If it is desired to produce a foamed plastic surface provided with a pattern according to this technique, and wherein there should be realized an exact matching or coincidence between the color pattern and the relief, then the same difficulties arise as with the technique where an originally uniformly foamed material is subsequently embossed.

U.S. Pat. No. 2,961,332, discloses a technique for the fabrication of a relief-like foamed plastic wherein a pattern is impressed at the rear face of a carrier material and certain portions of such pattern are imprinted at the rear face with two foamable thermoplastic resin mixtures. Both of these thermoplastic resin mixtures are notably different from one another by virtue of their content of foaming agent. Consequently, during foaming there is attained a different foaming effect for both resin mixtures and thus a relief-like structure of the final product. It should be readily appreciated that when working with this process it is only possible to fabricate relief patterns of very simple design and in this case there likewise are present the difficulties arising with the previously mentioned methods as regards coincidence between the printing pattern or design and the relief print or pattern.

Furthermore, in U.S. Pat. No. 2,825,282, there is disclosed a method in which a certain dye or ink is applied to a foamable base material. Thereafter, the base material is subjected to radiation so that only at those locations which are coated with the dye does there occur an absorption of the radiation which is sufficient for foaming the base material. With this procedure it is possible to relatively easily attain a good matching or coincidence between the relief print and the printing pattern or design, but such technique however is only capable of being successfully employed with extremely thin foamable layers, namely layers having thickness of about 0.5 mm. Moreover, in order to obtain an appropriate differentiation in the radiation absorption, as a practical matter, there only can be employed a black dye or ink.

Up to now, the best results could be obtained with the practice of the process disclosed in German Patent publication No. 1,504,106, corresponding to U.S. Pat. No. 3,293,094. In this patent, there is disclosed a process wherein a chemical inhibitor is applied in sections to the surface of a foamable layer. This inhibitor varies the decomposition of the foaming agent at these sections, so that after the foaming action triggered by heating, those locations of the surface where the inhibitor has been applied are depressed in relation to the remaining surfaces. With this technique it is possible to add an inhibitor to the dyes or inks employed for printing of the pattern, wherein if desired different dyes can contain different concentrations of inhibitor. Furthermore, it is possible to not directly apply the inhibitor to the surface of the material which is to be foamed, rather to a layer of a resin mixture free of a foaming agent and located over the foamable mass, whereby then the outer surface of the finished material carries the printing design or pattern. With this embodiment the printing design is thus subjected to a pronounced mechanical load and can be particularly easily scratched away at the raised locations. Furthermore, in FIGS. 10 to 13 of this German patent publication there is also disclosed a technique in which a pattern can be imprinted by means of printing dyes upon a thin transfer paper and thereafter there can be applied a foamable layer to the printing design or pattern located at the paper. Then the thus coated paper carrier with the foamable layer located thereon can be heated to the foaming temperature, whereby the foamable layer remains adhering to the paper carrier during foaming and the free surfaces of the foamable material which do not possess any paper carrier exhibit a depression at those locations where the paper carrier has been provided with the inhibitor. After the foaming operation, the paper carrier is removed. This modified process as described in the aforementioned German patent publication also only can be employed where it is desired to provide an aerated or foamed plastic with a desired relief or embossed pattern; it is however not possible to simultaneously apply a colored pattern corresponding to the relief pattern, because this colored pattern, if there is applied to the surface of the paper colored inhibitor-containing inks, would be located at the non-embossed side of the surface.

If the method described in German Patent publication No. 1,504,106 is carried out such that a colored pattern is imprinted upon the foamable base layer, and wherein the employed dyes or inks possess different content of foam inhibitors or are completely free from the same, then it is possible to obtain a very good coincidence between the printing pattern or design and the relief print. The essential drawback of such technique, however, resides in the fact that the surface of the gelled foamable layer only can be printed or impressed with difficulty, and that for imprinting such type relatively thick layers it is necessary to employ high roller pressures and therefore expensive pressure rollers and printing presses.

SUMMARY OF THE INVENTION

With the foregoing in mind, it is a primary object of the present invention to provide a new and improved method of providing a foam plastic surface with a relief structure in a manner not associated with the aforementioned drawbacks and limitations of the prior art proposals.

Another object of the present invention aims at avoiding the aforementioned drawbacks which arise during imprinting of thick layers.

Still a further object of this invention is directed to means for carrying out the method of the invention for providing a foam or foamed plastic surface with a relief structure.

DETAILED DESCRIPTION OF THE INVENTION

Now it has been surprisingly found that such difficulties can be overcome if a printing design or pattern is produced as a thin non-swellable, self-supporting film or a film located at a carrier material which is generally a temporary carrier material, wherein such printing pattern in exact coincidence with the dyes or colors of the printing design of the film or self-supporting film is capable of preventing swelling of the foam plastic and/or delivering accelerating means to a foamable plastic surface when such is brought into contact with the aforementioned film, and wherein furthermore, prior, during or after the swelling operation, there occurs a permanent and fixed anchoring of the printed film with the embossed foamed plastic surface.

The invention aims at the provision of a method of providing foam or foamed plastic surfaces with a relief structure in which a pattern is applied to the surface of a base layer which is to be foamed prior to foaming, wherein during the course of the foaming operation means which inhibit and/or accelerate foaming penetrates into the base layer, during the course of the foaming operation, at certain locations of the base layer corresponding to the applied pattern. As a result, after foaming there is obtained a surface, the relief of which corresponds to the applied pattern. The method of this development is characterized by the features that there are fabricated printed non-foamable films or printed films which at certain locations, corresponding to the printing pattern or design, contain either (a) means which inhibit and/or accelerate foaming, or (b) a barrier layer material which prevents the passage of the means which inhibits or accelerates foaming, and the printed non-foamable printed film film, prior to foaming, is applied to the base layer to be foamed and this combined material is heated to the foaming temperature, after any possibly employed temporary carrier has been removed, wherein by means of the migration of the means which inhibits and/or accelerates foaming, corresponding to the printed pattern of the film, into the base layer during foaming there is attained the formation of the relief of the surface.

A notable advantage of the inventive method resides in the fact that a printing design or pattern is produced upon a nonfoamable or a film located at a carrier material which is generally a temporary carrier material and the film is preferably extremely thin, whereby the aforementioned materials can be easily imprinted and while using printing devices employing considerably lower roller pressure. Furthermore, at this aforementioned relatively thin material, there can be produced with extreme precision a well-defined or sharp printing design. The thus-printed non-foamable films or films located upon a carrier material then can be stored and, if desired, shipped and then be employed at a later period of time for the production of a foamed plastic material equipped with a printing design and embossed surface. Storage is therefore extremely facilitated and it is also possible in a very short period of time, in accordance with demand, to provide a foam plastic with a predetermined relief-like printing design.

During the performance of the inventive method, three embodiments are particularly advantageous.

1. First embodiment of the method.

A non-foamable self-supporting film, or a film located upon a temporary carrier material, can be provided with a printing design or pattern, in that printing dyes are employed having different content of means which inhibit and/or accelerate the foaming action.

a. If a thus-fabricated non-foamable film is applied to a pre-gelled foamable layer and this composite material heated to the foaming-and gelling temperature, then there is obtained a foamed plastic material provided with a relief design, wherein there is located over the printing design a useful layer, that is to say, a wear-resistant protective layer, from the non-foamable film material. Of course, this non-foamable film material must be sufficiently transparent and preferably it also should be colorless so that the printing design can be viewed through this useful layer in its full embossment and the original color tone.

b. If a thus imprinted non-selfsupporting film is located at a temporary carrier material or release paper, for instance siliconized paper, then it is important that such film is initially transferred to the foamable layer and only then is the foaming action carried out. For this purpose, the film located at the carrier material is brought into contact with the foamable support or substrate and heated to a sufficiently high temperature so that there is insured for adherence of the film at the foamable substrate and the film carrier can be stripped-off. However, the temperature should not be so great that foaming is already started. Thereafter, possibly after application of a clear useful layer, heating is continued until attaining the foaming temperature. As a result, depending upon the printing pattern or design of the film, that is to say, the content of the materials which inhibit and/or accelerate foaming in the printing dyes, there is obtained an "embossment" of the foam plastic surface.

In both of the aforementioned cases (a) and (b) the reproduction of the pattern at the finished foamed material is the mirror image of that of the originally imprinted non-foamable foil or the film located at the carrier material.

2. Second embodiment of the method.

At a non-foamable self-supporting film or a film located at a carrier material, there is initially produced a uniform layer of the means which inhibits and/or accelerates foaming. Then a pattern is imprinted upon this uniform layer, wherein the different colored dyes or inks possess a varying content of a barrier layer material which prevents the penetration or passage of the means which inhibits or accelerates foaming.

Anchoring of the non-foamable film at the foamable material and the transfer of the film located at the carrier material to the foamable material occurs in the manner described above with respect to the first embodiment (1) of the method. At those locations where the printing dye or ink contains a barrier layer material, the means which inhibit and/or accelerates foaming is prevented from reaching the foamable layer, whereas at the remaining locations the transfer or passage of such means is insured. There again occurs in this case an embossment which produces a true reproduction of the pattern.

3. Third embodiment of the method.

This embodiment can only be employed in those situations where a film located at a carrier material should be transferred to the foamable substrate or base support, however cannot be employed for applying an imprinted non-foamable film to the foamable layer material. With this embodiment of the method the film located at the carrier material is provided with a printing design, whereby analogous to the second embodiment (2) of the method individual printing dyes or inks possess different content of a barrier layer material which prevents the passage of the means which inhibits or accelerates foaming. This printed film therefore only contains the barrier layer material and is completely free of the means which inhibits or accelerates foaming.

The transfer of the film from the carrier material to the foamable substrate or base support or layer occurs in the manner described in conjunction with the first embodiment (1) of the method. As soon as the film carrier has been removed and the printed film is located at the foamable substrate or support, there then occurs either with the aid of an applied liquid, for instance a solution, or through introduction into an appropriate gaseous atmosphere, a treatment of the surface provided with the printing design with the aid of the means which inhibits or accelerates foaming. By virtue of the barrier or blocking layers which are present or absent at the printing pattern or design there is obtained the result that the aforementioned means can only penetrate at certain locations up to the region of the foamable substrate or support. After this treatment there is undertaken foaming in the manner disclosed in conjunction with the first embodiment (1) or the second embodiment (2) of the invention.

The third embodiment (3) of the invention possesses the advantage over the second embodiment (2) and the first embodiment (1) of the invention that the film provided for storage and located at the carrier material is completely free of such materials which inhibit or accelerate foaming. A number of such materials are namely relatively unstable, whereas practically all of the barrier layer materials are capable of being stored.

A further aim of the invention is directed towards providing a foam or foamed plastic surface with an impressed or embossed pattern according to the method aspects of this development.

Hence the invention is also concerned with means for the performance of the aforesaid method aspects. Such means is characterized by the features that it constitutes a printed nonfoamable self-supporting film or a printed film located at a temporary carrier material, wherein predetermined locations of the film corresponding to the printing design contain either (a) means which inhibit and/or accelerate foaming, or (b) a barrier layer material which prevents the passage of the aforesaid means which inhibits or accelerates foaming.

When practicing the method aspects of this development, there are maintained such conditions that the individual steps do not interfere with one another. Hence, the gelling temperature of the foamable material is beneath the foaming temperature and the transfer temperature of the film to the base layer is again beneath the gelling temperature.

The foamable base layer may be located upon a substrate which, after foaming, either remains bonded with the foamed base layer or can be removed from the foamed material. As the substrate there can be employed a fiber reinforced material, felt, fabric or paper, or a foil such as a plastic or metal foil. Further over the pattern-impressed foamed surface there can be located a layer of a non-foamable transparent or translucent material.

While there is shown and described present preferred embodiments of the invention, it is to be distinctly understood that the invention is not limited thereto, but may be otherwise variously embodied and practiced within the scope of the following claims. ACCORDINGLY,

What is claimed is:

1. An article for simultaneously providing one side of a foamable substrate with an embossed design and a colored pattern in coincidence with said embossed design, comprising a preform including a non-foamable transparent film and a removable carrier material for supporting said film, said film having printed thereon a pattern in printing inks, at least one of said printing inks containing a foam inhibitor/accelerator material.

2. An article as defined in claim 1 wherein the non-foamable transparent film is wear resistant.

3. An article for simultaneously providing one side of a foamable substrate with an embossed design and a colored pattern in coincidence with said embossed design, comprising a preform including a non-foamable transparent film and a removable carrier material for supporting said film, said film having printed thereon a pattern in printing inks, at least one of said printing inks containing a barrier material for a foam inhibitor/accelerator material, said film being adapted to be treated with a liquid or gaseous foam inhibitor/accelerator material.

4. An article as defined in claim 3 wherein the non-foamable transparent film is wear resistant.

5. An article for simultaneously providing one side of a foamable substrate with an embossed design and a colored pattern in coincidence with said embossed design, comprising a preform including a non-foamable transparent film and a removable carrier material for supporting said film, said film having coated thereon a uniform layer of a foam inhibitor/accelerator material, said uniform layer having printed thereon a pattern in printing inks, at least one of said inks containing a barrier material for said foam inhibitor/accelerator material.

6. An article as defined in claim 5 wherein the non-foamable transparent film is wear resistant.

7. In a process for simultaneously providing one side of a foamable substrate with an embossed design and a colored pattern, wherein, during the course of foaming, foam inhibitor/accelerator material penetrates into the foamable substrate at certain locations, the improvement comprising the steps of:
   a. applying, to one side of the substrate to be foamed, a preform including a non-foamable transparent film and a removable carrier material for supporting said film, said film having printed thereon a pattern in printing inks, at least one of said printing inks containing a foam inhibitor/accelerator material to form a composite material;
   b. heating the composite material to a temperature at which said non-foamable film adheres to said one side of the foamable substrate;
   c. removing the carrier material; and
   d. further heating the composite material to the foaming temperature of the substrate to obtain an embossed design coinciding with a colored pattern on said one side of the foamable substrate.

8. The method as defined in claim 7, including the step of employing a substrate to be foamed which is located at a carrier and the carrier, following foaming, remains connected with the foamed substrate.

9. The method as defined in claim 7, including the step of employing a substrate to be foamed which is located at a carrier and after foaming the carrier is removed from the foamed substrate.

10. The method as defined in claim 7, further including the step of employing a substrate to be foamed which is located at a carrier, and wherein the carrier comprises a fiber reinforced material.

11. The method as defined in claim 7, further including the step of employing a substrate to be foamed which is located at a carrier, and wherein the carrier is a material selected from felt, fabric, paper or a foil.

12. The method as defined in claim 11, wherein the foil is selected from plastic foils or metal foils.

13. In a process for simultaneously providing one side of a foamable substrate with an embossed design and a colored pattern, wherein, during the course of foaming, foam inhibitor/accelerator material penetrates into the foamable substrate at certain locations, the improvement comprising the steps of:
   a. applying, to one side of the substrate to be foamed, a preform including a non-foamable transparent film and a removable carrier material for supporting said film, said film having printed thereon a pattern in printing inks, at least one of said printing inks containing a barrier material for a foam inhibitor/accelerator material, said preform being adapted to be treated with a liquid or gaseous foam inhibitor/accelerator material to form a composite material;
   b. heating the composite material to a temperature at which said non-foamable film adheres to said one side of the foamable substrate;
   c. removing the carrier material;
   d. treating the side of the composite material which is provided with the non-foamable film with a liquid or gaseous foam inhibitor/accelerator material; and
   e. further heating the composite material to the foaming temperature of the substrate to obtain an embossed design coinciding with a colored pattern on said one side of the foamable substrate.

14. The method as defined in claim 13, including the step of employing a substrate to be foamed which is located at a carrier and the carrier, following foaming, remains connected with the foamed substrate.

15. The method as defined in claim 13, including the step of employing a substrate to be foamed which is located at a carrier and after foaming the carrier is removed from the foamed substrate.

16. The method as defined in claim 13, including the step of employing a substrate to be foamed which is located at a carrier, and wherein the carrier comprises a fiber reinforced material.

17. The method as defined in claim 13, including the step of employing a substrate to be foamed which is located at a carrier, and wherein the carrier is a material selected from felt, fabric, paper or foil.

18. The method as defined in claim 17, wherein the foil is selected from plastic foils or metal foils.

19. In a process for simultaneously providing one side of a foamable substrate with an embossed design and a colored pattern, wherein, during the course of foaming, foam inhibitor/accelerator material penetrates into the foamable substrate at certain locations, the improvement comprising the steps of:
   a. applying, to one side of the substrate to be foamed, a preform including a non-foamable transparent film and a removable carrier material for supporting said film, said film having coated thereon a uniform layer of a foam inhibitor/accelerator material, said uniform layer having printed thereon a pattern in printing inks, one of said inks containing a barrier material for said foam inhibitor/accelerator material to form a composite material;
   b. heating the composite material to a temperature at which said non-foamable film adheres to said one side of the foamable substrates;
   c. removing the carrier material; and
   d. further heating the composite material to the foaming temperature of the substrate to obtain an embossed design coinciding with a colored pattern on said one side of the foamable substrate.

20. The method as defined in claim 19, including the step of employing a substrate to be foamed which is located at a carrier and the carrier, following foaming, remains connected with the foamed substrate.

21. The method as defined in claim 19, including the step of employing a substrate to be foamed which is located at a carrier and after foaming the carrier is removed from the foamed substrate.

22. The method as defined in claim 19, including the step of employing a substrate to be foamed which is located at a carrier, and wherein the carrier comprises a fiber reinforced material.

23. The method as defined in claim 19, including the step of employing a substrate to be foamed which is located at a carrier, and wherein the carrier is a material selected from felt, fabric, paper or foil.

24. The method as defined in claim 23, wherein the foil is selected from plastic foils or metal foils.

* * * * *